(12) United States Patent
Hasegawa et al.

(10) Patent No.: US 8,204,105 B2
(45) Date of Patent: Jun. 19, 2012

(54) TRANSCODER AND CODED IMAGE CONVERSION METHOD

(75) Inventors: Hiromu Hasegawa, Osaka (JP); Nobuyuki Takasu, Osaka (JP); Mayumi Okumura, Osaka (JP); Akira Okamoto, Osaka (JP); Takashi Matsumoto, Tokyo (JP); Norihiko Nagai, Tokyo (JP)

(73) Assignees: MegaChips Corporation, Osaka-shi (JP); NTT Electronics Corporation, Tokyo (JP)

( * ) Notice: Subject to any disclaimer, the term of this patent is extended or adjusted under 35 U.S.C. 154(b) by 1368 days.

(21) Appl. No.: 11/774,427

(22) Filed: Jul. 6, 2007

(65) Prior Publication Data
US 2008/0031337 A1 Feb. 7, 2008

(30) Foreign Application Priority Data
Aug. 4, 2006 (JP) ................. 2006-212869

(51) Int. Cl.
*H04B 1/66* (2006.01)
*H04N 7/12* (2006.01)

(52) U.S. Cl. ............... 375/240; 375/240.01; 375/240.02; 375/240.12; 382/162

(58) Field of Classification Search ............ 375/240, 375/240.01–240.012; 240/12
See application file for complete search history.

(56) References Cited

U.S. PATENT DOCUMENTS

| | | | |
|---|---|---|---|
| 6,208,688 B1 * | 3/2001 | Seo et al. ............... | 375/240.03 |
| 7,330,509 B2 * | 2/2008 | Lu et al. ............... | 375/240.03 |
| 7,453,937 B2 * | 11/2008 | Henocq et al. ......... | 375/240.03 |
| 7,483,488 B1 * | 1/2009 | Hsu et al. .............. | 375/240.12 |
| 7,555,041 B2 * | 6/2009 | Sato ...................... | 375/240.05 |
| 7,593,462 B2 * | 9/2009 | Shimada et al. ...... | 375/240.03 |
| 7,859,956 B2 * | 12/2010 | Shibata et al. ........ | 369/47.1 |
| 7,864,838 B2 * | 1/2011 | Kadono et al. ........ | 375/240.02 |
| 2003/0206588 A1 * | 11/2003 | Etoh et al. ............. | 375/240.13 |
| 2004/0246373 A1 * | 12/2004 | Kadono et al. ........ | 348/384.1 |
| 2005/0058196 A1 * | 3/2005 | Fernandes ............. | 375/240.2 |
| 2005/0058197 A1 * | 3/2005 | Lu et al. ................ | 375/240.03 |
| 2005/0152452 A1 * | 7/2005 | Suzuki .................. | 375/240.16 |
| 2005/0169369 A1 * | 8/2005 | Lee ....................... | 375/240.03 |

(Continued)

FOREIGN PATENT DOCUMENTS

| | | |
|---|---|---|
| JP | 2001-169283 | 6/2001 |
| JP | 2005-5862 | 1/2005 |
| JP | 2005-252609 | 9/2005 |
| JP | 2006-74635 | 3/2006 |

(Continued)

OTHER PUBLICATIONS

Thomas Wiegand, Rate-constrained coder control and comparison of video coding standards, Jul. 2003, IEEE, vol. 13 No. 7, pp. 1-16.*

*Primary Examiner* — Nathan Flynn
*Assistant Examiner* — Viral Lakhia
(74) *Attorney, Agent, or Firm* — Oblon, Spivak, McClelland, Maier & Neustadt, L.L.P.

(57) ABSTRACT

A quantization step determination part inputs an evaluation value (ACT_MB) indicating the dispersion in a macroblock and its average value (ACT_PIC). A subtracter obtains the difference between these values, and a multiplier multiplies the difference by $r_{aq}$ (<1) to obtain a weighting value. Next, an adder adds the weighting value to an average quantization step value of source data, and finally a multiplier multiplies the sum by a step value adjustment factor $\alpha$ (>1) to obtain a converted quantization step value (Qstep_AVC). This optimizes a bit allocation in accordance with an Activity value of the macroblock, to thereby improve the quality of image.

33 Claims, 14 Drawing Sheets

U.S. PATENT DOCUMENTS

| | | | |
|---|---|---|---|
| 2006/0013304 A1* | 1/2006 | Maeda et al. | 375/240.11 |
| 2007/0009027 A1* | 1/2007 | Zhu et al. | 375/240.03 |
| 2007/0140576 A1 | 6/2007 | Sato et al. | |
| 2008/0181297 A1* | 7/2008 | Kadono et al. | 375/240.02 |

FOREIGN PATENT DOCUMENTS

| | | |
|---|---|---|
| KR | 10-2003-0061809 | 7/2003 |
| KR | 2003-0083109 | 10/2003 |
| KR | 10-2005-0010814 | 1/2005 |

* cited by examiner

TRANSCODER AND CODED IMAGE CONVERSION METHOD

BACKGROUND OF THE INVENTION

1. Field of the Invention

The present invention relates to a technique for converting coded images on the basis of standards such as MPEG2 and H.264.

2. Description of the Background Art

Images to be delivered on digital broadcasts, those to be stored in media such as DVDs and hard disks, and the like are compressed in accordance with various coding systems. The object for such compressions is to avoid constraint on a transmission band, increase the transmission speed, decrease the memory size or the like.

Among the coding systems that have been conventionally adopted is MPEG2. The MPEG2 is a coding system that can be used for communication media or broadcasting media, as well as for recording in storage media. The MPEG2 is widely used as an image coding system in digital broadcasts, video conferences, videophone systems or the like.

As a new standard for image coding system, an H.264 (or MPEG4-AVC) has been developed. The H.264 achieves a compression ratio twice to four times as high as that of the MPEG2.

As discussed above, there are various standards for image coding system. And there is a case where the coding system is converted for the purpose of reducing the amount of codes in a coded image that is inputted. A transcoder once decodes the inputted coded image. Then, the transcoder codes the decoded image in different coding system (or the same coding system) again.

Japanese Patent Application Laid Open Gazette No. 2006-74635 relates to a transcoder for converting an image compressed in a first compressive coding system into an image compressed in a second compressive coding system. This transcoder compresses the image in the second compressive coding system by using intermediate information which is generated in decoding the image compressed in the first compressive coding system.

By using such a transcoder to reduce the amount of codes in the supplied coded image, it is possible to decrease the size of an image to be recorded in a storage medium. Further, even when an image is transmitted to another computer or apparatus, it is possible to reduce the load on a band and speed up the processing. Thus, using the transcoder provides many merits. Though such transcoders have been developed, no specific processing method or no optimal processing technique has been suggested yet in any of inventions including one disclosed in Japanese Patent Application Laid Open Gazette No. 2006-74635.

SUMMARY OF THE INVENTION

The present invention is intended for a transcoder. According to an aspect of the present invention, the transcoder comprises decoder means for decoding a first coded image, means for calculating a macroblock evaluation value indicating the degree of dispersion in pixel values inside a macroblock of an image obtained by decoding in the decoder means, means for obtaining an average macroblock evaluation value by averaging the macroblock evaluation values in a frame, and encoder means for encoding the image obtained by decoding in the decoder means to generate a second coded image, and in the transcoder of the present invention, the encoder means comprises means for acquiring an average quantization step value by averaging quantization step values in a frame of the first coded image, weighting value calculation means for calculating a weighting value for each macroblock on the basis of the difference between the macroblock evaluation value and the average macroblock evaluation value, and step value calculation means for calculating a converting quantization step value for each macroblock of the second coded image on the basis of a value obtained by adding the weighting value to the average quantization step value.

By the transcoder of the present invention, it is possible to optimize a bit allocation for the converted image and improve the quality of image.

According to another aspect of the present invention, the transcoder further comprises means for inputting a macroblock motion evaluation value indicating the degree of variation in a time direction, of a macroblock of an image obtained by decoding in the decoder means, and in the transcoder of the present invention, the step value calculation means includes means for multiplying the average quantization step value by a motion adjustment value calculated on the basis of the macroblock motion evaluation value.

It is thereby achieve further improvement in quality of the converted image.

Further, the transcoder of the present invention adjusts the quantization step value in accordance with the target bit rate. It is thereby possible to reduce the amount of codes to the target rate and decrease the data size of the coded image, and this ensures improvement in image transmission speed and reduction in storage capacity.

Therefore, it is an object of the present invention to provide a specific method for efficient conversion of coded images.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
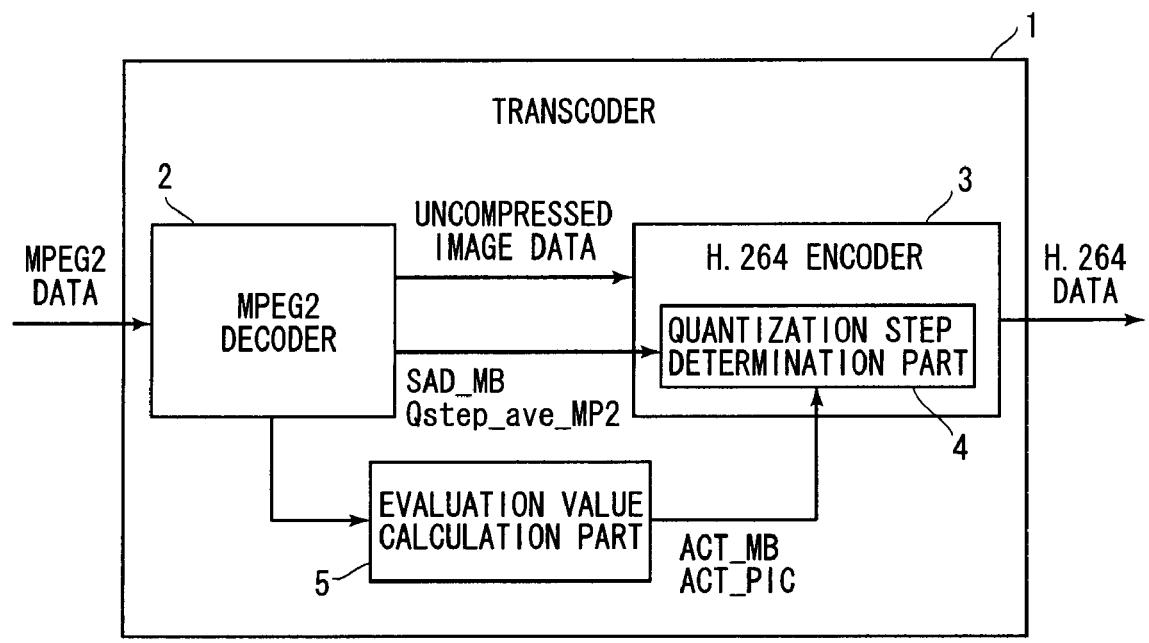
FIG. 1 is a block diagram showing a transcoder in accordance with the present invention.

Hereinafter, the preferred embodiments of the present invention will be discussed with reference to figures. FIG. 1 is a block diagram showing a transcoder 1 in accordance with the preferred embodiments. The transcoder 1 of the preferred embodiments inputs image data coded in MPEG2 and outputs image data coded in H.264. As shown in FIG. 1, the transcoder 1 comprises an MPEG2 decoder 2, an H.264 encoder 3 and an evaluation value calculation part 5.

The MPEG2 decoder 2 is a processing part for inputting stream data of MPEG2 and decoding a coded image that is compressed. The MPEG2 decoder 2 therefore outputs uncompressed image data. This uncompressed image data is inputted to the H.264 encoder 3. The H.264 encoder 3 is a processing part for coding the image data which is decoded in the MPEG2 decoder 2, in H.264 again.

The H.264 encoder 3 comprises a quantization step determination part 4, as shown in FIG. 1. The H.264 encoder 3 performs orthogonal transform of image data. Then, the coefficient of the orthogonally transformed image for each frequency component is quantized and the quantized coefficient is coded, to compress the image data. The H.264 encoder 3 uses a quantization step value calculated by the quantization step determination part 4 when it quantizes the coefficient of the orthogonally transformed image for each frequency component.

The evaluation value calculation part 5 is a processing part for calculating macroblock evaluation values ACT_MB and an average macroblock evaluation value ACT_PIC. The evaluation value calculation part 5 inputs the decoded image data from the MPEG2 decoder 2 and calculates the macroblock evaluation values ACT_MB and the average macroblock evaluation value ACT_PIC on the basis of this image data.

The macroblock evaluation value ACT_MB indicates an Activity (ACT) value for each macroblock. This is a differential absolute value sum of an average pixel value in a macroblock and a pixel value of each pixel in the macroblock, which is calculated for each macroblock. In other words, the macroblock evaluation value ACT_MB is an evaluation value indicating the degree of dispersion in pixels in the macroblock. The evaluation value is similar to the Activity value used in a code amount control model TM5 or the like of MPEG2.

If an image of a macroblock is a flat image, the differential absolute value sum of a pixel value of each pixel and an average pixel value is small. On the other hand, if an image of the macroblock has great variations, the differential absolute value sum is large. In other words, a macroblock having large macroblock evaluation value ACT_MB is one of an image having great variations and a macroblock having small macroblock evaluation value ACT_MB is one of a flat image.

Calculation of the macroblock evaluation value ACT_MB may be performed by using luminance values of pixels in the macroblock. Specifically, the differential absolute value sum of an average luminance value of pixels in the macroblock and a luminance value of each pixel in the macroblock is calculated and then the macroblock evaluation value ACT_MB is calculated from the differential absolute value sum. If the image data inputted from the MPEG2 decoder 2 is image data in YCbCr space, for example, the macroblock evaluation value ACT_MB may be calculated by using a pixel value of Y component for each pixel. Pixel values of any component other than luminance component, however, may be used. In a case of image data in RGB space, for example, calculation of macroblock evaluation value ACT_MB may be performed by using pixel values of G component, or by using pixel values of any other color component.

After inputting image data decoded by the MPEG2 decoder 2 and calculating the macroblock evaluation value ACT_MB for each macroblock, the evaluation value calculation part 5 further calculates an average macroblock evaluation value ACT_PIC that is obtained by averaging macroblock evaluation values ACT_MB for one frame. The average macroblock evaluation value ACT_PIC is an evaluation value indicating the degree of variation in image in one frame as it is obtained by averaging the macroblock evaluation values ACT_MB which are calculated for all the macroblocks in one frame. In other words, in a frame having a small average macroblock evaluation value ACT_PIC, many macroblocks have flat images, and in a frame having a large average macroblock evaluation value ACT_PIC, many macroblocks have images of great variations.

After the evaluation value calculation part 5 thus calculates the macroblock evaluation values ACT_MB and the average macroblock evaluation value ACT_PIC, these evaluation values are outputted to the quantization step determination part 4.

In the MPEG2 decoder 2, in decoding the MPEG2 stream, a macroblock motion evaluation value SAD_MB is calculated out. The macroblock motion evaluation value SAD_MB is an interframe differential absolute value sum of the pixels inside the macroblock and the pixels inside a reference image macroblock. In other words, this is an absolute value sum of difference in pixel value between a pixel in the macroblock and a pixel in the reference image macroblock on the same coordinate position. Therefore, the macroblock motion evaluation value SAD_MB is an evaluation value indicating the degree of variation in each macroblock in a time direction. If the macroblock motion evaluation value SAD_MB is large, the image of the macroblock has more motion, and if the macroblock motion evaluation value SAD_MB is small, the image of the macroblock has less motion.

In calculation of the macroblock motion evaluation value SAD_MB, like calculation of the macroblock evaluation value ACT_MB, the luminance value of each pixel may be used. Alternatively, any other component may be used.

After the MPEG2 decoder 2 calculates the macroblock motion evaluation value SAD_MB in a decoding process, the macroblock motion evaluation value SAD_MB is outputted to the quantization step determination part 4.

Further, the MPEG2 decoder 2 calculates an average quantization step value Qstep_ave_MP2 from the inputted MPEG2 stream. The average quantization step value Qstep_ave_MP2 is an average of quantization step values in all the macroblocks inside one frame. Then, the calculated average quantization step value Qstep_ave_MP2 is outputted to the quantization step determination part 4.

Thus, the quantization step determination part 4 inputs the macroblock evaluation value ACT_MB, the average macroblock evaluation value ACT_PIC, the macroblock motion evaluation value SAD_MB and the average quantization step value Qstep_ave_MP2. Then, the quantization step determination part 4 calculates a quantization step value Qstep_AVC for H.264 encoding, from these pieces of information. The H.264 encoder 3 inputs the uncompressed image data which is outputted from the MPEG2 decoder 2 and performs orthogonal transform of this image data to dissolve it into images of frequency components, and then quantizes the coefficient to be given to an image of each frequency component by using the quantization step value Qstep_AVC which is determined by the quantization step determination part 4.

Though discussion is made on a constitution in which the evaluation value calculation part 5 is an independent processing part (block) for calculating the macroblock evaluation value ACT_MB and the average macroblock evaluation value ACT_PIC in the preferred embodiments, the processing part for calculating these evaluation values may be provided inside the MPEG2 decoder 2. Alternatively, the processing part may be provided inside the H.264 encoder 3. Hereafter, exemplary constitutions of the quantization step determination part 4 in accordance with the respective preferred embodiments will be discussed.

<The First Preferred Embodiment>

Figure 2:
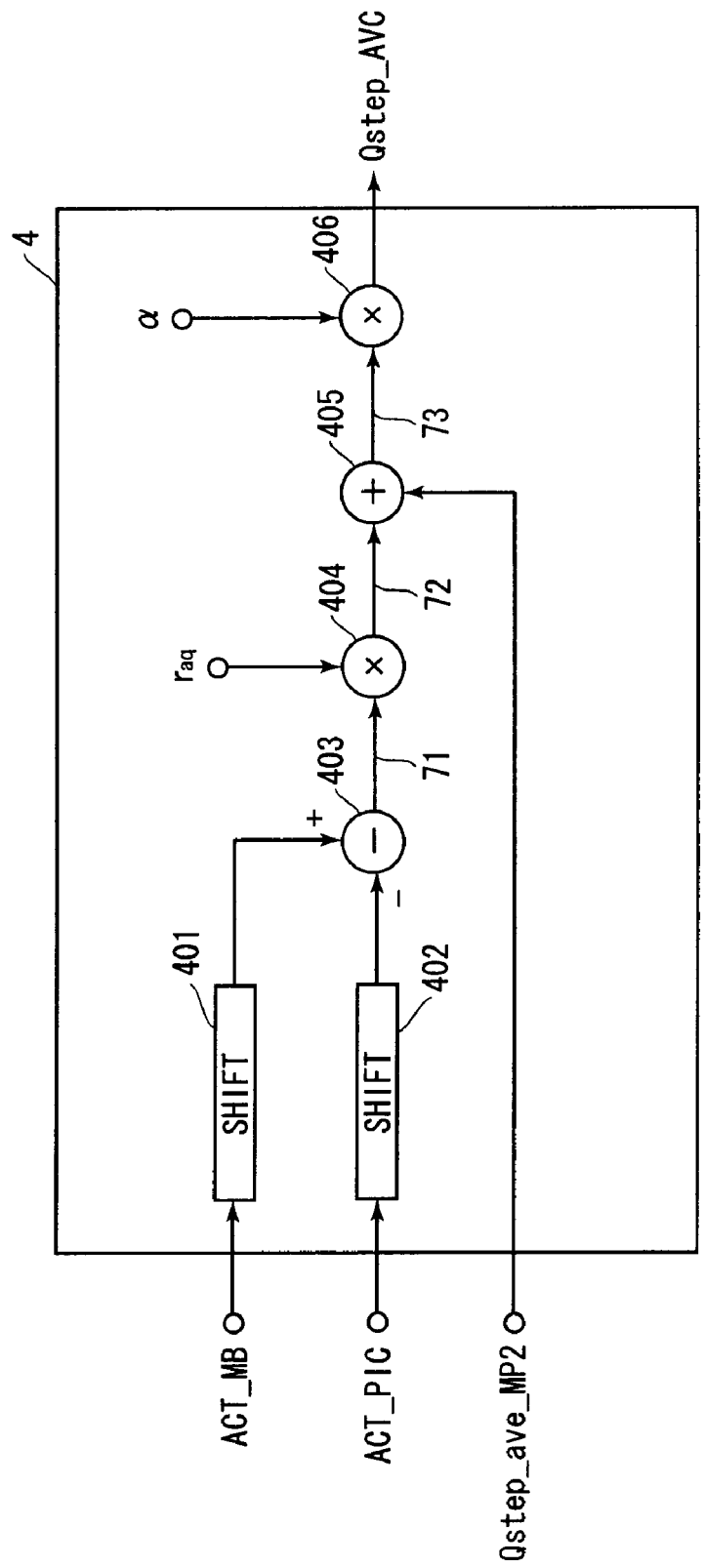
FIG. 2 is a block diagram showing a quantization step determination part in accordance with a first preferred embodiment.

FIG. 2 is a block diagram showing a quantization step determination part 4 in accordance with the first preferred embodiment. This quantization step determination part 4 comprises two shift operation units 401 and 402, a subtracter 403, a multiplier 404, an adder 405 and a multiplier 406.

This quantization step determination part 4 inputs the macroblock evaluation value ACT_MB, the average macroblock evaluation value ACT_PIC and the average quantization step value Qstep_ave_MP2.

The macroblock evaluation value ACT_MB is inputted to the shift operation unit 401 and the average macroblock evaluation value ACT_PIC is inputted to the shift operation unit 402, and then a shift operation is performed to adjust figures of these values.

The macroblock evaluation value ACT_MB and the average macroblock evaluation value ACT_PIC both after being subjected to the shift operation are inputted to the subtracter 403. In the subtracter 403 performed is an operation of subtracting the average macroblock evaluation value ACT_PIC from the macroblock evaluation value ACT_MB. The subtraction result indicates how the macroblock evaluation value ACT_MB of each macroblock is away from the average macroblock evaluation value ACT_PIC, and from this degree of dispersion, a final step value is calculated. Therefore, this subtraction result is determined as a base weighting value 71.

The base weighting value 71 is next inputted to the multiplier 404, to be multiplied by a weighting value adjustment factor $r_{aq}$. The weighting value adjustment factor $r_{aq}$ is smaller than 1, which is stored in a not-shown storage part inside the quantization step determination part 4. In other words, the weighting value adjustment factor $r_{aq}$ is used to reduce the oscillation range of the base weighting value 71. Though the subtraction result of the subtracter 403 indicates how the macroblock evaluation value ACT_MB of each macroblock is away from the average macroblock evaluation value ACT_PIC in the frame and the final step value is determined from the degree of oscillation, as discussed above, multiplication by the weighting value adjustment factor $r_{aq}$ is performed in order to avoid too much effect of the degree of dispersion on determination of the step value.

By multiplying the base weighting value 71 by the weighting value adjustment factor $r_{aq}$, a weighting value 72 is calculated. The weighting value 72 is next inputted to the adder 405, to be added to the average quantization step value Qstep_ave_MP2.

As discussed above, the average quantization step value Qstep_ave_MP2 is an average value of the quantization step values in one frame of the MPEG2 data inputted by the transcoder 1. More specifically, it is an average value of the quantization step values in MPEG2 of the frame which is currently processed by the quantization step determination part 4. Therefore, addition of the weighting value 72 to the average quantization step value Qstep_ave_MP2 is to adjust the step value by the weighting value 72 which is calculated on the basis of the macroblock evaluation value ACT_MB and the average macroblock evaluation value ACT_PIC, with reference to the quantization step value set in the MPEG2. In other words, a large step value is assigned to a macroblock of an image having great variations, and a small step value is assigned to a macroblock of a flat image.

Thus, in the adder 405, by adding the weighting value 72 to the average quantization step value Qstep_ave_MP2, a base quantization step value 73 is calculated. The base quantization step value 73 is next inputted to the multiplier 406, to be multiplied by a step value adjustment factor α. By this multiplication, the quantization step value Qstep_AVC is calculated. Eq. 1 expresses the calculation for the encoding operation of the above-discussed first preferred embodiment.

$$Qstep\_AVC = ((ACT\_MB \gg mbit - ACT\_PIC \gg nbit) * r_{aq} + Qstep\_ave\_MP2) * \alpha \quad \text{(Eq. 1)}$$

In Eq. 1, >>mbit represents a shift operation of m bits in the shift operation unit 401 and >>nbit represents a shift operation of n bits in the shift operation unit 402. Also by adjusting the amount of shift, it is possible to adjust the final quantization step value Qstep_AVC.

In this case, the step value adjustment factor α is a value larger than 1 and stored in the not-shown storage part inside the quantization step determination part 4. Since the step value adjustment factor α is a value larger than 1, this functions to change the base quantization step value 73 to a slightly larger value (as the amount of shift and the multiplication factor are adjusted so that the output of the adder 405 may become 0 or more). As discussed above, by adding the weighting value 72 to the average quantization step value Qstep_ave_MP2, the base quantization step value 73 is calculated. The base quantization step value 73 functions to adjust the step value to be assigned to each macroblock, in accordance with the condition of the image of the macroblock. Specifically, the base quantization step value 73 functions to make the step value larger for a macroblock of an image having great variations and make the step value smaller for a macroblock of a flat image, and functions to optimize how the codes are assigned to the macroblocks. On the other hand, the step value adjustment factor α functions to make the whole of step values larger and reduce the amount of codes.

After the quantization step value Qstep_AVC for a macroblock is thus calculated, the quantization step determination part 4 performs the same operation for the next macroblock to calculate the quantization step value Qstep_AVC therefore. While the same operation is repeatedly performed for all the macroblocks in one frame, the same average macroblock evaluation value ACT_PIC and the same average quantization step value Qstep_ave_MP2 are used. Then, by repeatedly inputting the macroblock evaluation value ACT_MB for each macroblock, the quantization step values Qstep_AVC for all the macroblocks in one frame are calculated. After the above operation for a frame, the same operation is performed again for the next frame.

As discussed above, by using the transcoder 1 of the first preferred embodiment, it is possible to assign a large step value to a macroblock of an image having great variations and assign a small step value to a macroblock of a flat image. A larger number of codes are thereby assigned to a flat image portion and this improves the reproduction of even a small change in the image. On the other hand, a small number of codes are assigned to an image portion having great variations, on which a slight round-off has no effect. This allows well-balanced adjustment in the amount of codes and thereby improves the quality of image. Further, since the whole of step values are made larger by multiplication by the step value adjustment factor α, it is possible to decrease the amount of codes and reduce the amount of data of H.264.

<The Second Preferred Embodiment>

Figure 3:
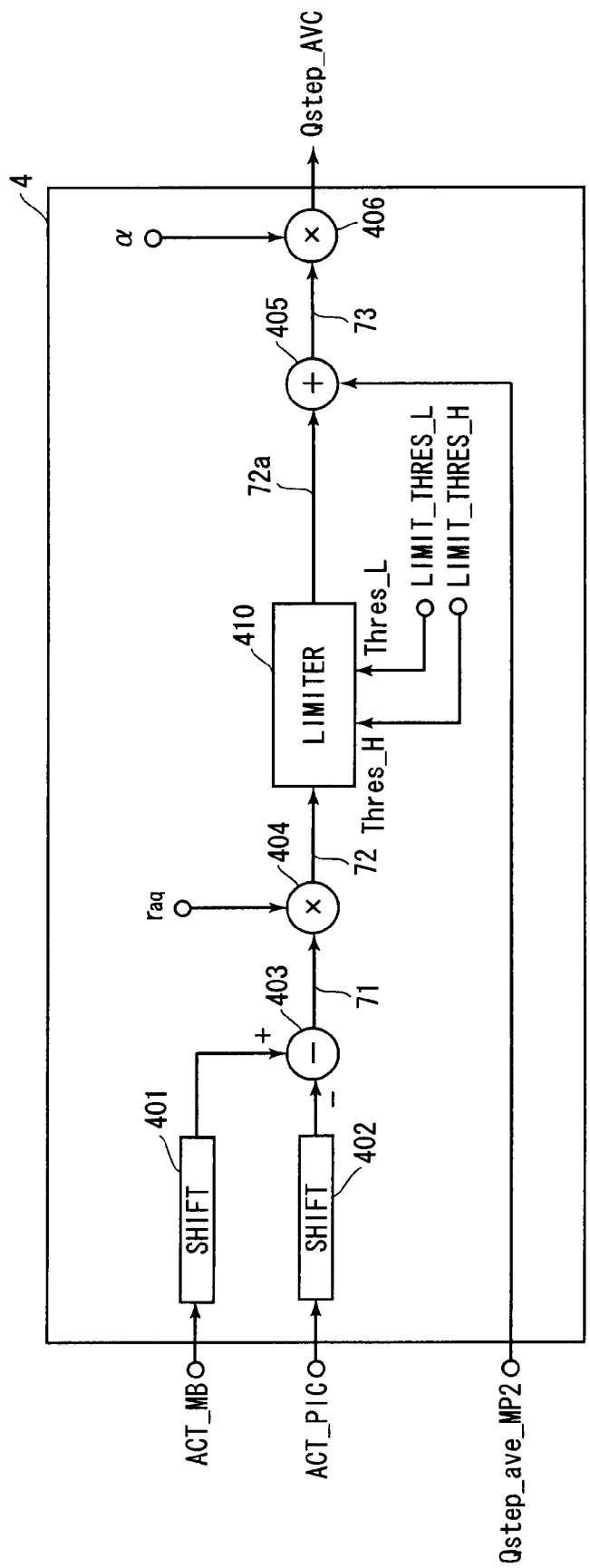
FIG. 3 is a block diagram showing a quantization step determination part in accordance with a second preferred embodiment.

Next, discussion will be made on the second preferred embodiment of the present invention. FIG. 3 is a block diagram showing a quantization step determination part 4 in accordance with the second preferred embodiment. In FIG. 3, the constituent elements identical to those of the first preferred embodiment are represented by the same reference signs. Hereinafter, constituent elements different from those of the first preferred embodiment will be discussed and the same constituent elements will not be discussed.

As shown in FIG. 3, in the quantization step determination part 4 of the second preferred embodiment, a limiter 410 is provided between the multiplier 404 and the adder 405. The limiter 410 is a processing part for limiting the (oscillation) range of the weighting value 72 outputted from the multiplier 404. The limiter 410 has two input terminals, and sets an upper limit threshold value (Thres_H) which is inputted from one of the input terminals, to the upper limit of the weighting value 72. Further, the limiter 410 sets a lower limit threshold value (Thres_L) which is inputted from the other input terminal, to the lower limit of the weighting value 72. Since the weighting values 72 always include positive values and negative values, the lower limit threshold value (Thres_L) is a negative value.

In the not-shown storage part included in the quantization step determination part 4, a fixed upper limit threshold value (LIMIT_THRES_H) and a fixed lower limit threshold value (LIMIT_THRES_L) are stored. In the second preferred embodiment, the limiter 410 clips the upper limit of oscillation range of the weighting value 72 with the fixed upper limit threshold value (LIMIT_THRES_H) inputted from the storage part as the upper limit threshold value (Thres_H) and clips the lower limit of oscillation range of the weighting value 72 with the fixed lower limit threshold value (LIMIT_THRES_L) inputted from the storage part as the lower limit threshold value (Thres_L).

The limiter 410 clips the upper limit and the lower limit of the weighting value 72 inputted from the multiplier 404 and outputs a limited weighting value 72a. The following processing is the same as that of the first preferred embodiment. The average quantization step value Qstep_ave_MP2 is added to the limited weighting value 72a and the sum is further multiplied by the step value adjustment factor α, the quantization step value Qstep_AVC is thus calculated.

In the second preferred embodiment, by limiting the upper limit and the lower limit of the weighting value 72, it is possible to prevent the quantization step value Qstep_AVC from being extremely changed in accordance with the condition of the macroblock.

<The Third Preferred Embodiment>

Figure 4:
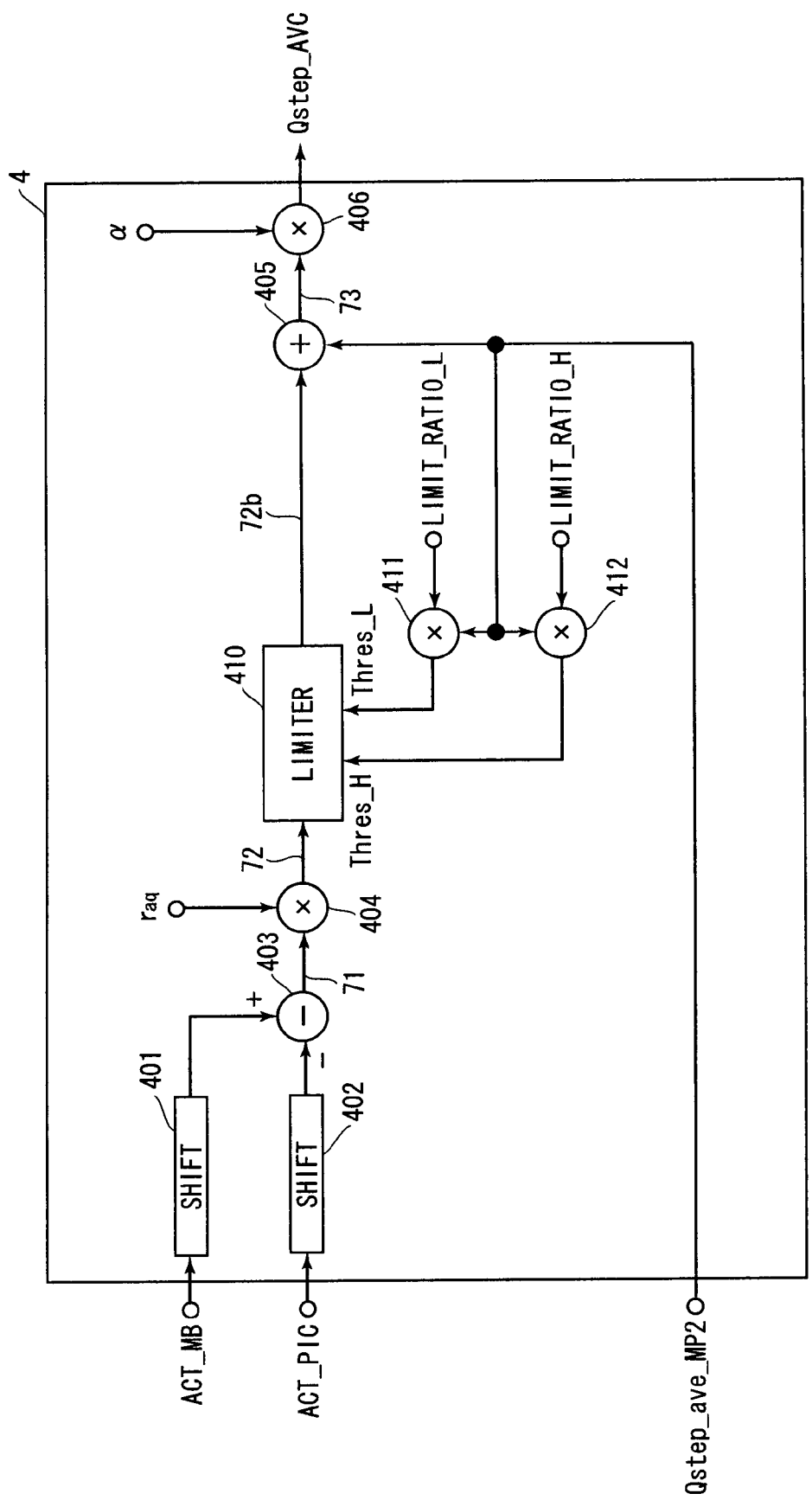
FIG. 4 is a block diagram showing a quantization step determination part in accordance with a third preferred embodiment.

Next, discussion will be made on the third preferred embodiment of the present invention. FIG. 4 is a block diagram showing a quantization step determination part 4 in accordance with the third preferred embodiment. In FIG. 4, the constituent elements identical to those of the first and second preferred embodiments are represented by the same reference signs. Hereinafter, constituent elements different from those of the first or second preferred embodiment will be discussed and the same constituent elements will not be discussed.

The quantization step determination part 4 of the third preferred embodiment further comprises two multipliers 411 and 412. The output side of the multiplier 411 is connected to the input terminal of the limiter 410 for the lower limit threshold value (Thres_L) and the output side of the multiplier 412 is connected to the input terminal of the limiter 410 for the upper limit threshold value (Thres_H). The multiplier 411 inputs a lower limit ratio (LIMIT_RATIO_L) stored in the not-shown storage part and the average quantization step value Qstep_ave_MP2, and the multiplier 412 inputs an upper limit ratio (LIMIT_RATIO_H) stored in the not-shown storage part and the average quantization step value Qstep_ave_MP2.

The multiplier 411 multiplies the average quantization step value Qstep_ave_MP2 by the lower limit ratio (LIMIT_RATIO_L) and outputs the multiplication result as the lower limit threshold value (Thres_L) to the limiter 410, and the multiplier 412 multiplies the average quantization step value Qstep_ave_MP2 by the upper limit ratio (LIMIT_RATIO_H) and outputs the multiplication result as the upper limit threshold value (Thres_H) to the limiter 410.

The limiter 410 clips the upper limit and the lower limit of the weighting value 72 inputted from the multiplier 404 and outputs a limited weighting value 72b. The following processing is the same as that of the first preferred embodiment. The average quantization step value Qstep_ave_MP2 is added to the limited weighting value 72b and the sum is further multiplied by the step value adjustment factor α, the quantization step value Qstep_AVC is thus calculated.

Also in the third preferred embodiment, by limiting the upper limit and the lower limit of the weighting value 72, it is possible to prevent the quantization step value Qstep_AVC from being extremely changed in accordance with the condition of the macroblock. Further, in the first and second preferred embodiments, if the average quantization step value Qstep_ave_MP2 is very small, in other words, the quantization step value of the original MPEG2 is very small, there is a possibility that the quantization step value Qstep_AVC should stick to 0 (in this case, actually, the step value is corrected to be 1 in a later step). In the third preferred embodiment, however, since the lower limit threshold value (Thres_L) can be determined in accordance with the average quantization step value Qstep_ave_MP2, it is possible to prevent the quantization step value Qstep_AVC from sticking to 0. In other words, the lower limit threshold value (Thres_L) is a negative value, and if the average quantization step value Qstep_ave_MP2 is very small, it is possible to prevent the quantization step value Qstep_AVC from sticking to 0 as the lower limit threshold value (Thres_L) is adjusted to become larger.

<The Fourth Preferred Embodiment>

Figure 5:
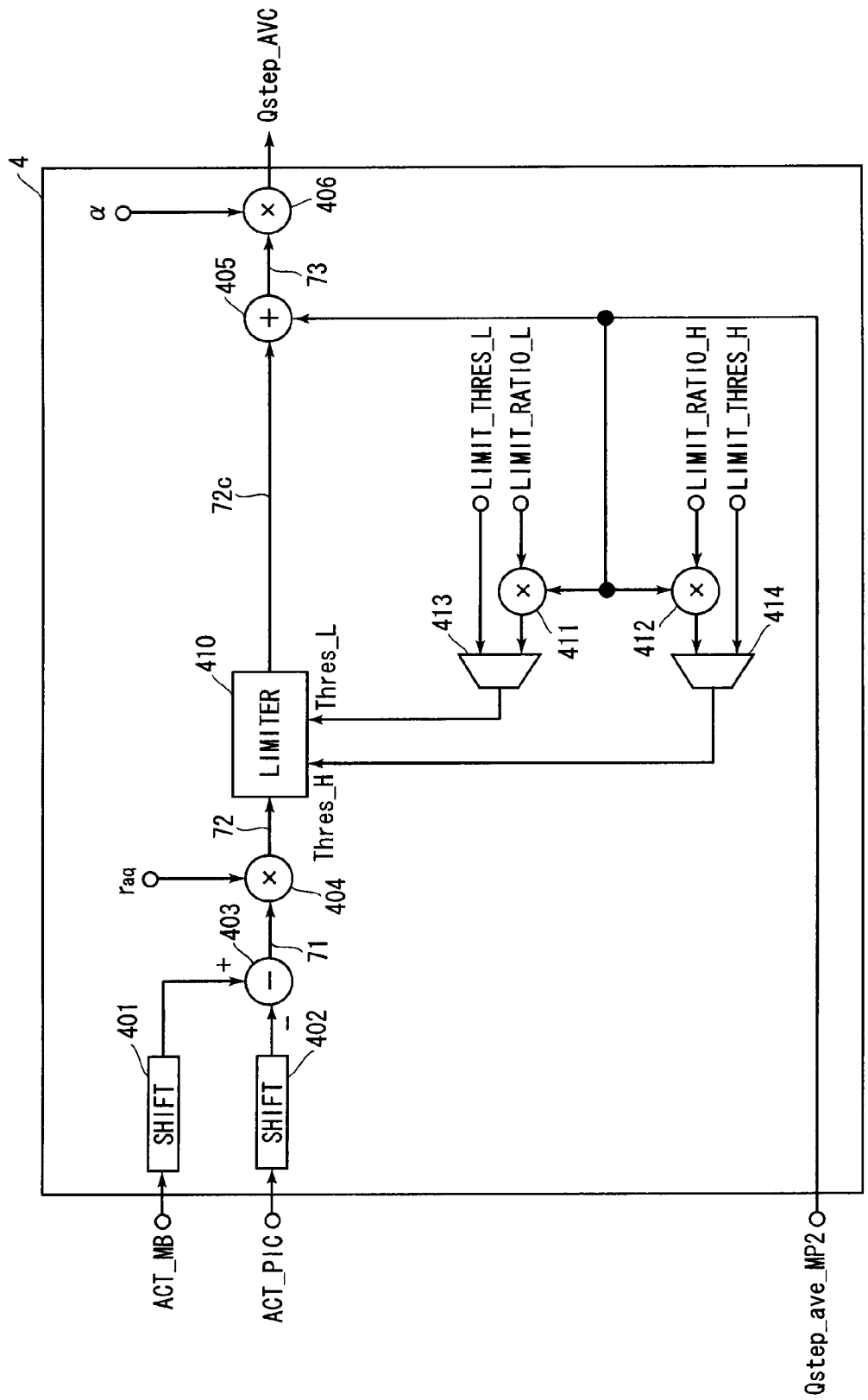
FIG. 5 is a block diagram showing a quantization step determination part in accordance with a fourth preferred embodiment.

Next, discussion will be made on the fourth preferred embodiment of the present invention. FIG. 5 is a block diagram showing a quantization step determination part 4 in accordance with the fourth preferred embodiment. In FIG. 5, the constituent elements identical to those of the first to third preferred embodiments are represented by the same reference signs. Hereinafter, constituent elements different from those of the first, second or third preferred embodiment will be discussed and the same constituent elements will not be discussed.

The quantization step determination part 4 of the fourth preferred embodiment combines the second and third preferred embodiments. As shown in FIG. 5, the quantization step determination part 4 further comprises selectors 413 and 414.

The selector 413 has two inputs. One of the inputs is the fixed lower limit threshold value (LIMIT_THRES_L) described in the second preferred embodiment and the other one is the output of the multiplier 411 described in the third preferred embodiment. Similarly, the selector 414 has two inputs. One of the inputs is the fixed upper limit threshold value (LIMIT_THRES_H) described in the second preferred embodiment and the other one is the output of the multiplier 412 described in the third preferred embodiment.

Specifically, the fixed limit value is used in the second preferred embodiment and the limit value calculated in accordance with the average quantization step value Qstep_ave_MP2 is used in the third preferred embodiment. In the fourth preferred embodiment, one out of the two limit values, which makes the oscillation range of the weighting value 72 smaller, is selected. Therefore, the selector 413 outputs one of the two inputs, which is larger, as the lower limit threshold value (Thres_L) to the limiter 410, and the selector 414 outputs one of the two inputs, which is smaller, as the upper limit threshold value (Thres_H) to the limiter 410.

With this constitution, like in the second and third preferred embodiments, it is possible to limit the upper limit and the lower limit of the weighting value 72 and further to prevent the quantization step value Qstep_AVC from being extremely changed in accordance with the condition of the macroblock. Further, since a limit value which makes the oscillation range of the weighting value 72 smaller is selected out of the fixed limit value and the limit value calculated in accordance with the average quantization step value Qstep_ave_MP2, it is possible to prevent the quantization step value Qstep_AVC from sticking to 0 and to suppress the oscillation range of the weighting value 72.

<The Fifth Preferred Embodiment>

Figure 6:
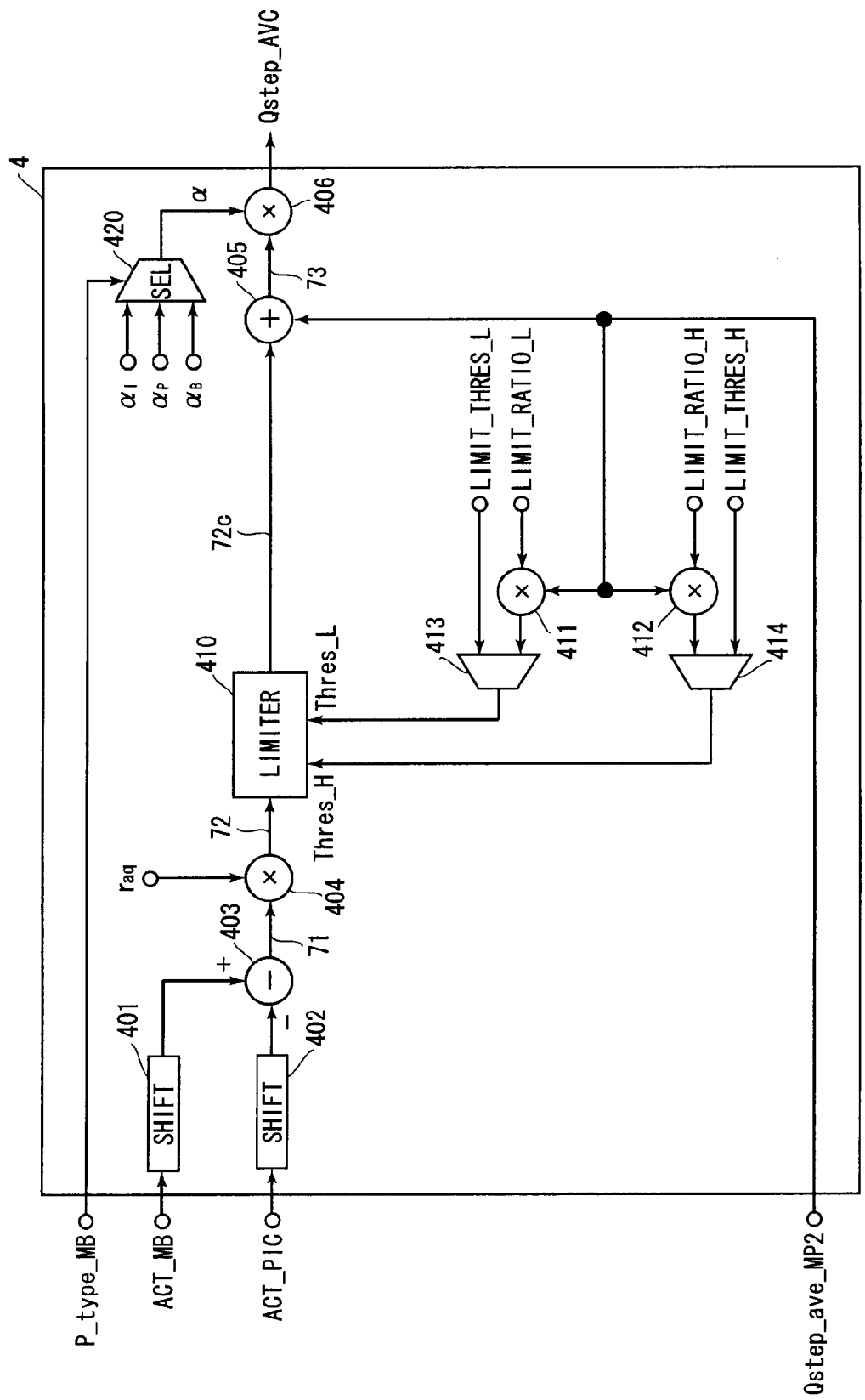
FIG. 6 is a block diagram showing a quantization step determination part in accordance with a fifth preferred embodiment.

Next, discussion will be made on the fifth preferred embodiment of the present invention. FIG. 6 is a block diagram showing a quantization step determination part 4 in accordance with the fifth preferred embodiment. In FIG. 6, the constituent elements identical to those of the first to fourth preferred embodiments are represented by the same reference signs. Hereinafter, constituent elements different from those of the first, second, third, or fourth preferred embodiment will be discussed and the same constituent elements will not be discussed.

The quantization step determination part 4 of the fifth preferred embodiment further comprises a selector 420. The selector 420 inputs three types of picture adjustment factors $\alpha I$, $\alpha P$ and $\alpha B$ and outputs a step value adjustment factor $\alpha$. The selector 420 further inputs picture type information P_type_MB in order to judge which one of the picture adjustment factors $\alpha I$, $\alpha P$ and $\alpha B$ should be selected. The picture type information P_type_MB is information indicating that the macroblock which is currently processed is an I-picture, a P-picture or a B-picture. The three types of picture adjustment factors $\alpha I$, $\alpha P$ and $\alpha B$ which are stored in the not-shown storage part are adjustment factors of step value which are set correspondingly to the I-picture, the P-picture and the B-picture in advance.

The selector 420 inputs the current picture type information P_type_MB, selects the corresponding picture adjustment factor $\alpha I$, $\alpha P$ or $\alpha B$ in accordance with the information and outputs the value as the step value adjustment factor $\alpha$ to the multiplier 406. The following processing is the same as that of the first preferred embodiment.

In the fifth preferred embodiment, the step value adjustment factor $\alpha$ can be changed in accordance with the picture type. This makes it possible to assign the optimal amount of codes in accordance with the picture type. For example, a coding operation to assign a large amount of codes to the I-picture is performed for MPEG2 while for H.264, such an assignment is not needed and such an adjustment can be made as to make the picture adjustment factor $\alpha I$ larger than any of the other picture adjustment factors $\alpha P$ and $\alpha B$.

<The Sixth Preferred Embodiment>

Figure 7:
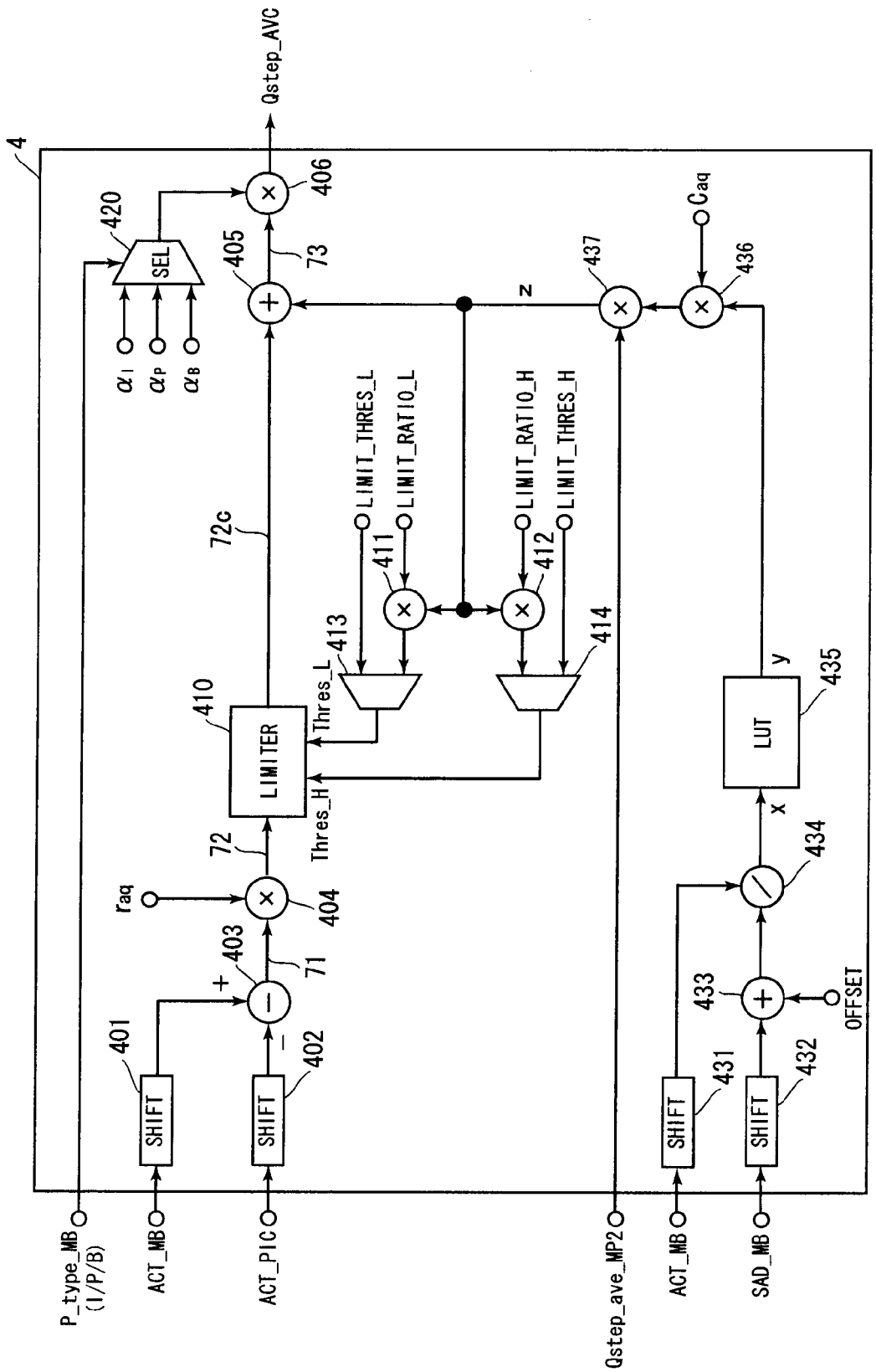
FIG. 7 is a block diagram showing a quantization step determination part in accordance with a sixth preferred embodiment.

Next, discussion will be made on the sixth preferred embodiment of the present invention. FIG. 7 is a block diagram showing a quantization step determination part 4 in accordance with the sixth preferred embodiment. In FIG. 7, the constituent elements identical to those of the first and fifth preferred embodiments are represented by the same reference signs. Hereinafter, constituent elements different from those of the first, second, third, fourth or fifth preferred embodiment will be discussed and the same constituent elements will not be discussed.

The quantization step determination part 4 of the sixth preferred embodiment uses a SAD value to adjust the average quantization step value Qstep_ave_MP2 to be used as a reference for calculating the quantization step value Qstep_AVC.

As shown in FIG. 7, the quantization step determination part 4 further comprises shift operation units 431 and 432, an adder 433, a divider 434, a look-up table 435 and multipliers 436 and 437.

The macroblock evaluation value ACT_MB is inputted to the shift operation unit 431 and the macroblock motion evaluation value SAD_MB is inputted to the shift operation unit 432, and then a shift operation is performed to adjust figures of these values. Further, an offset value is added to the macroblock motion evaluation value SAD_MB after being subjected to the shift operation in the adder 433. The offset value is an adjustment value to adjust the ratio of the macroblock evaluation value ACT_MB and the macroblock motion evaluation value SAD_MB.

The macroblock evaluation value ACT_MB after being subjected to the shift operation and the macroblock motion evaluation value SAD_MB after being subjected to the shift operation and the offset operation are inputted to the divider 434. In the divider 434, the macroblock evaluation value ACT_MB is divided by the macroblock motion evaluation value SAD_MB. The division result x is expressed in Eq. 2:

$$x=(ACT\_MB>>p\text{bit})/((SAD\_MB>>q\text{bit})+\text{OFFSET}) \quad \text{(Eq. 2)}$$

In Eq. 2, >>pbit represents a shift operation of p bits in the shift operation unit 431 and >>qbit represents a shift operation of q bits in the shift operation unit 432, and "+OFFSET" indicates addition of the offset value. The division result x represents the ratio of the macroblock evaluation value ACT_MB to the macroblock motion evaluation value SAD_MB. Specifically, the value of x becomes large for a macroblock of an image which has less motion in a time direction and great variations in a plane direction, and on the other hand, the value of x becomes small for a macroblock of an image which has more motion in a time direction or a flat image. The value of x can be adjusted by controlling the amount of shift in the shift operation units 431 and 432 or the offset value to be added in the adder 433.

Next, the value of x is inputted to the look-up table 435 and a corresponding output value y is obtained. The relation between the values x and y is expressed in Eq. 3:

$$y=\text{LUT}[x] \quad \text{(Eq. 3)}$$

The characteristic feature of the translation table LUT[] in the look-up table 435 lies in a monotone increasing function. Specifically, the larger the value of x becomes, the larger the value of y becomes. Further, if the value of x is smaller than a predetermined value, the value of y becomes smaller than 1, and if the value of x is larger than a predetermined value, the value of y becomes larger than 1.

The output value y is inputted to the multiplier 436, to be multiplied by an adjustment factor $C_{aq}$. Then, an output value of the multiplier 436 is inputted to the multiplier 437, to be multiplied by the average quantization step value Qstep_ave_MP2. With this multiplication, an adjustment value z of the average quantization step value Qstep_ave_MP2 is obtained. Eq. 4 expresses the calculation for obtaining the output value z of the multiplier 437.

$$z = C_{aq} * y * Qstep\_ave\_MP2 \quad \text{(Eq. 4)}$$

The value of x becomes large for a macroblock of an image which has less motion in a time direction and great variations in a plane direction. If the value of x is larger than a predetermined value and the value of y becomes larger than 1, the average quantization step value Qstep_ave_MP2 is adjusted to become larger than the original value. As a result, the quantization step value Qstep_AVC is also adjusted to become larger.

On the other hand, the value of x becomes small for a macroblock of an image which has more motion in a time direction or a flat image. If the value of x is smaller than a predetermined value and the value of y becomes smaller than 1, the average quantization step value Qstep_ave_MP2 is adjusted to become smaller than the original value. As a result, the quantization step value Qstep_AVC is also adjusted to become smaller.

The adjustment factor $C_{aq}$ is a factor to make fine adjustments for adjusting the average quantization step value Qstep_ave_MP2. By adjusting the adjustment factor $C_{aq}$ without any change to the table of the look-up table 435, fine adjustments of the quantization step value Qstep_AVC can be made.

Thus, in the sixth preferred embodiment, for a macroblock having a large SAD value and a small Activity value, the quality of image is improved by decreasing the quantization step value Qstep_AVC. For a macroblock having a small SAD value and a large Activity value, the amount of codes can be reduced by keeping or increasing the quantization step value Qstep_AVC.

The Activity value, which is obtained by the operation using an image in a frame, can be calculated for all the macroblocks in the frame. On the other hand, the SAD value can not be calculated if a frame to be processed is an I-picture, since there is no reference image macroblock. For this reason, if the frame to be processed is an I-picture, the SAD value of the immediately preceding P-picture is used as a substitute in this preferred embodiment.

Figure 8:
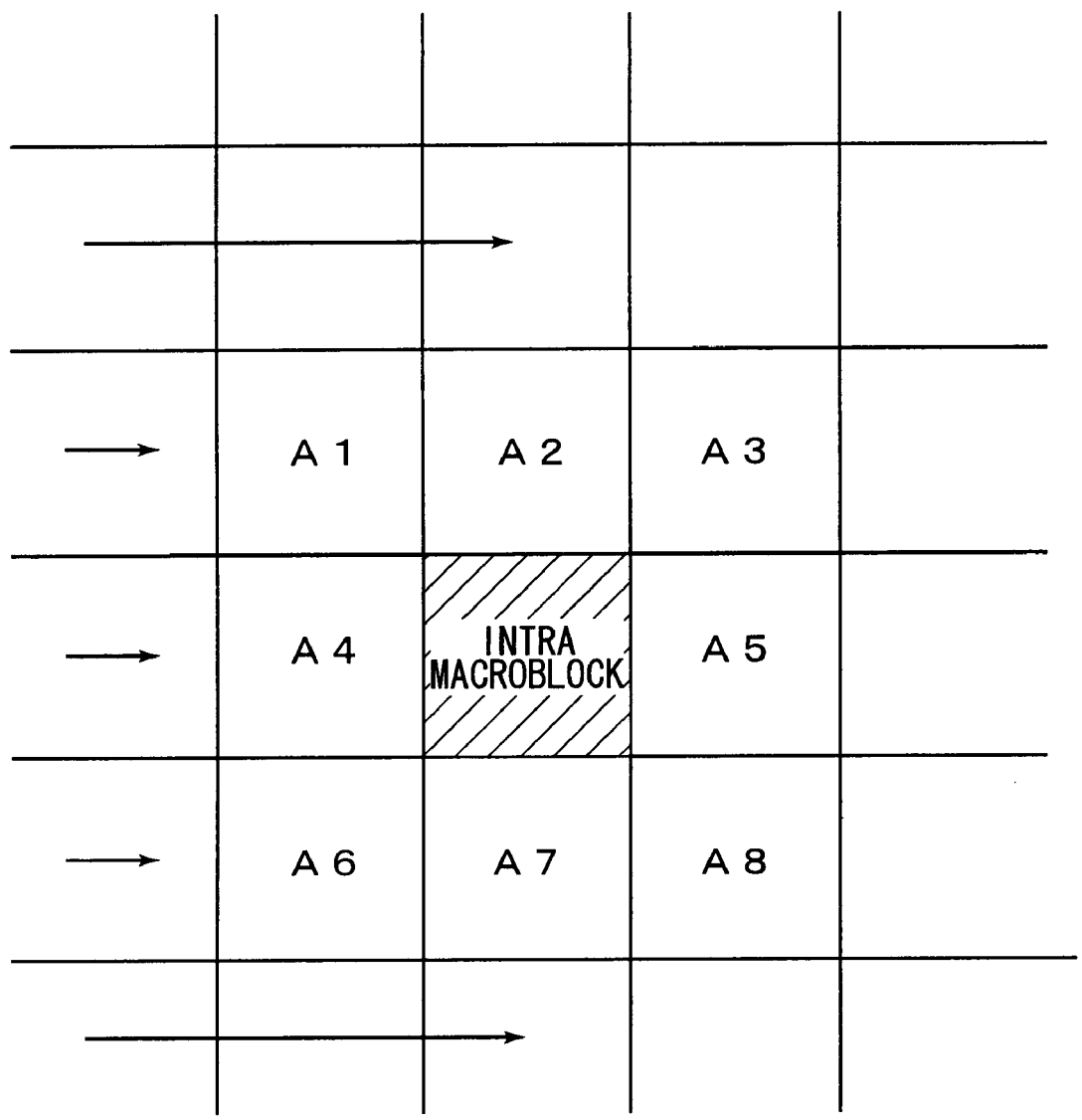
FIG. 8 is a view showing a method of calculating a SAD value in a case where there is an intra macroblock.

Further, even if the frame to be processed is a B-picture or a P-picture, sometimes there is an intra macroblock in the picture frame. Since the intra macroblock has no reference image macroblock, the SAD value can not be calculated. Then, in the sixth preferred embodiment, when there is an intra macroblock, the SAD value of its surrounding block is used as a substitute. As shown in FIG. 8, for example, the SAD value of the macroblock A4 immediately before the intra macroblock MB is used as a substitute. Alternatively, an average value of the SAD values of a plurality of past macroblocks (A1, A2, A3, and A4) may be used as a substitute. More alternatively, an average value of the SAD values of the eight surrounding blocks (A1 to A8) may be used as a substitute.

<The Seventh Preferred Embodiment>

Figure 9:
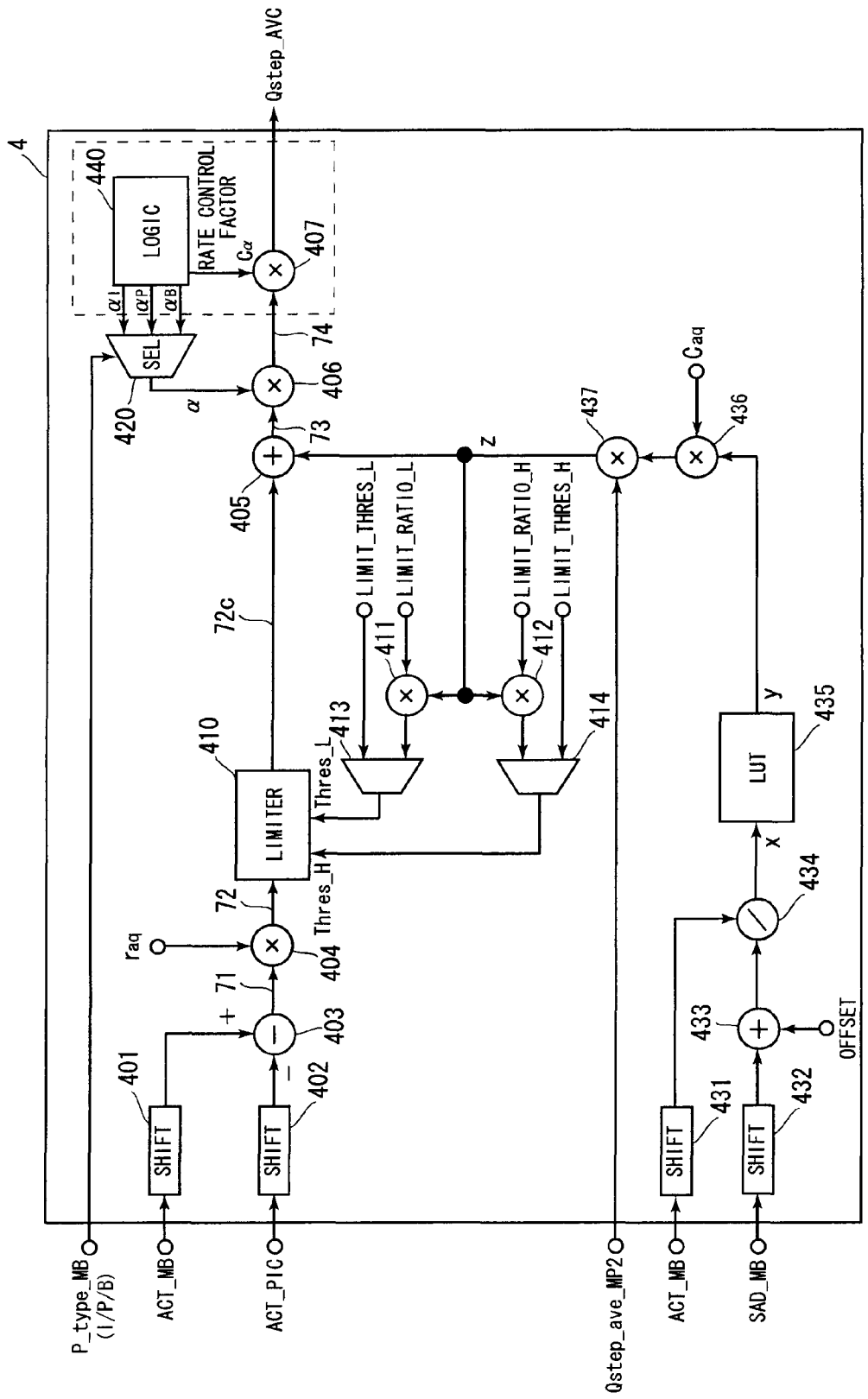
FIG. 9 is a block diagram showing a quantization step determination part in accordance with a seventh preferred embodiment.

Next, discussion will be made on the seventh preferred embodiment of the present invention. FIG. 9 is a block diagram showing a quantization step determination part 4 in accordance with the seventh preferred embodiment. In FIG. 9, the constituent elements identical to those of the first and sixth preferred embodiments are represented by the same reference signs. Hereinafter, constituent elements different from those of the first, second, third, fourth, fifth or sixth preferred embodiment will be discussed and the same constituent elements will not be discussed.

As shown in FIG. 9, the quantization step determination part 4 of the seventh preferred embodiment further comprises a factor operation part 440. The factor operation part 440 is an operation part for outputting the picture adjustment factors $\alpha I$, $\alpha P$ and $\alpha B$ and a rate control factor $C_\alpha$. Specifically, while fixed values stored in the storage part are used as the picture adjustment factors $\alpha I$, $\alpha P$ and $\alpha B$ in the fifth preferred embodiment, the picture adjustment factors $\alpha I$, $\alpha P$ and $\alpha B$ are calculated in this preferred embodiment.

Figure 10:
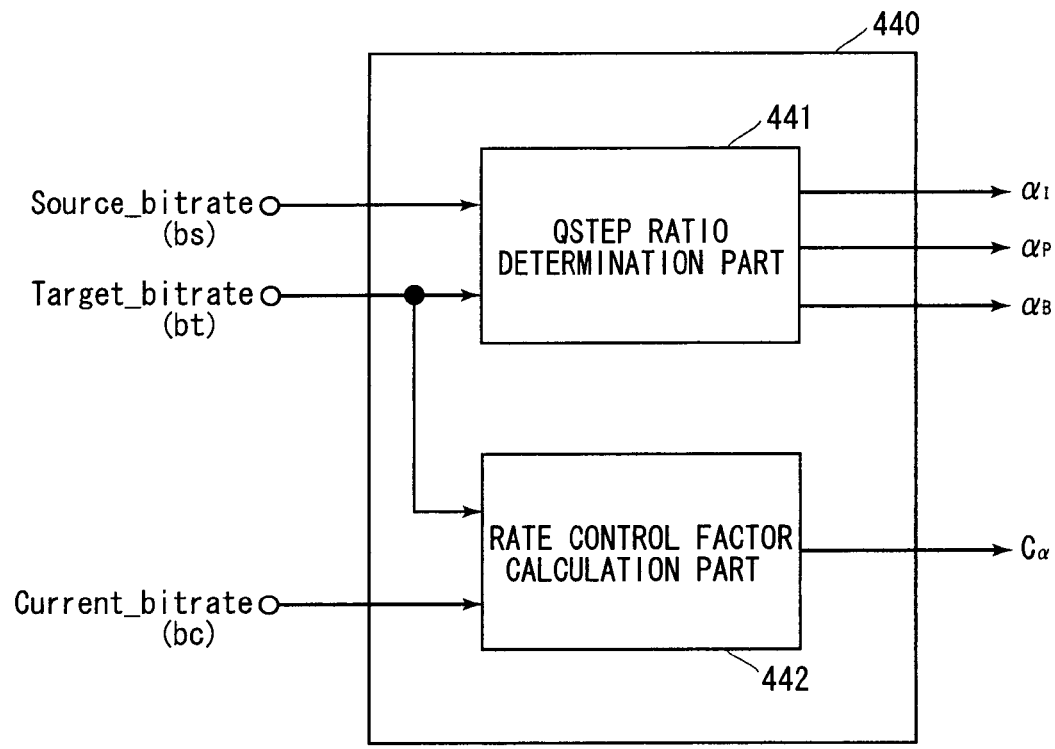
FIG. 10 is a block diagram showing a factor operation part.

FIG. 10 is a block diagram showing the factor operation part 440. The factor operation part 440 comprises a Qstep ratio determination part 441 and a rate control factor calculation part 442. As shown in FIG. 10, the factor operation part 440 inputs three bit rates to calculate the factors.

Among the three bit rates, a source bit rate (Source_bitrate: bs) is a bit rate for decoded MPEG2 data. Specifically, this is a bit rate for image data before being coded. As a value of the source bit rate (bs) used may be a value recorded in a sequence header of the source stream which is inputted to the transcoder 1. Alternatively, the value may be calculated from the amount of codes generated in immediately preceding GOP (Group of Picture). More alternatively, the value may be calculated from the amount of codes generated in a plurality of past GOPs or the amount of codes generated in a plurality of past frames.

A target bit rate (Target_bitrate: bt) is a bit rate for converted H.264 data which is set.

A current bit rate (Current_bitrate: bc) is a current coded bit rate. Specifically, this is a bit rate for the H.264 data that has been encoded for a predetermined time period. The value of the current bit rate may be calculated from the amount of codes generated in immediately preceding GOP (Group of Picture). Alternatively, the value may be calculated from the amount of codes generated in a plurality of past GOPs or the amount of codes generated in a plurality of past frames.

In other words, both the values of the source bit rate bs (MPEG2) and the current bit rate bc (H.264) are calculated from the amount of codes generated in past N GOPs (N; a plural number) or past M frames (M; a plural number). The initial values of N and M may be arbitrarily set by a user. This value may be changed during the processing as needed (through a CPU or the like).

Figure 11:
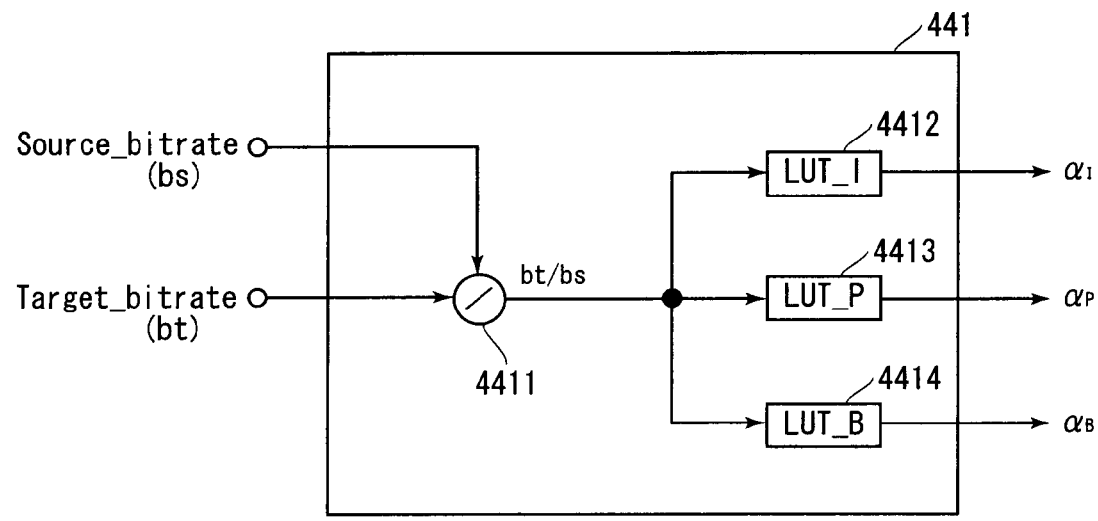
FIG. 11 is a block diagram showing a Qstep ratio determination part.

FIG. 11 is a block diagram showing the Qstep ratio determination part 441. The Qstep ratio determination part 441 comprises a divider 4411, look-up tables 4412, 4413 and 4414. The divider 4411 divides the inputted target bit rate (bt) by the source bit rate (bs). This division result represents a compression ratio (bt/bs). The calculated compression ratio is outputted to the look-up tables 4412, 4413 and 4414.

Figure 12:
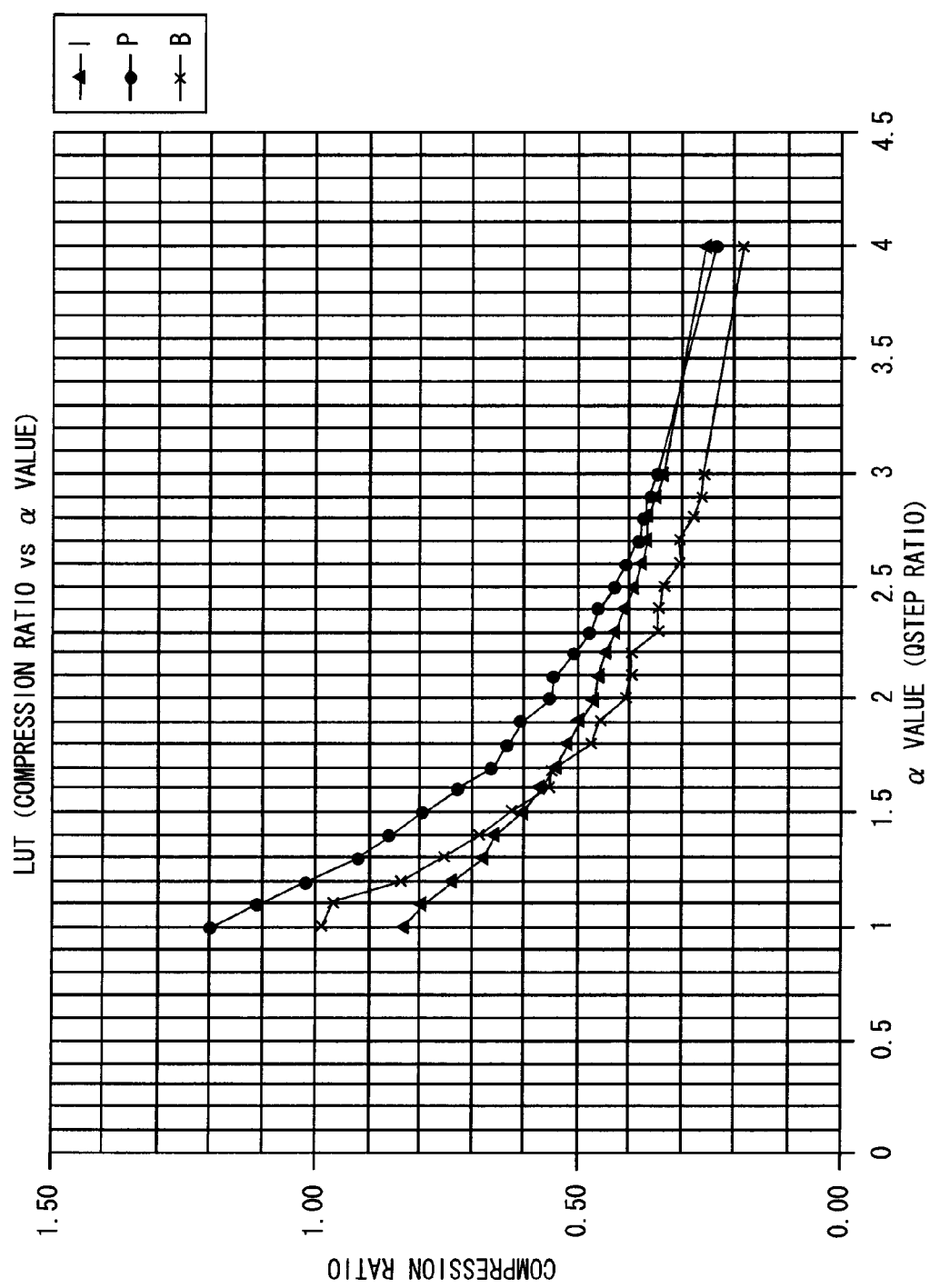
FIG. 12 is a graph showing a relation between a compression ratio and an a value (step value adjustment factor)

FIG. 12 is a graph showing a relation between input values (compression ratios: bt/bs) and output values ($\alpha$ values) in the look-up tables 4412, 4413 and 4414. Eq. 5 expresses the relation between the compression ratio (bt/bs) and the α value.

$$\alpha = LUT\,(bt/bs) \tag{Eq. 5}$$

The α values in FIG. 12 and Eq. 5 are, specifically, the picture adjustment factor αI for the look-up table 4412, the picture adjustment factor αP for the look-up table 4413 and the picture adjustment factor αB for the look-up table 4414. Thus, the values of the picture adjustment factors αI, αP and αB are obtained by using the look-up tables. In a range of the compression ratio exceeding 0.5, for example, the picture adjustment factor αI is larger than the picture adjustment factor αB, and the amount of codes for the I-picture, which is large for MPEG2, is reduced, as discussed earlier.

Referring to FIG. 9 again, the three picture adjustment factors αI, αP and αB are outputted from the factor operation part 440 and inputted to the selector 420. The selector 420 inputs the picture type information P_type_MB to specify the picture type of the currently-processed frame and outputs one of the picture adjustment factors αI, αP and αB, corresponding to the picture type, as the step value adjustment factor α. By the outputted step value adjustment factor α, the base quantization step value 73 is multiplied in the multiplier 406. Thus, an adjustment quantization step value 74 is calculated.

Figure 13:
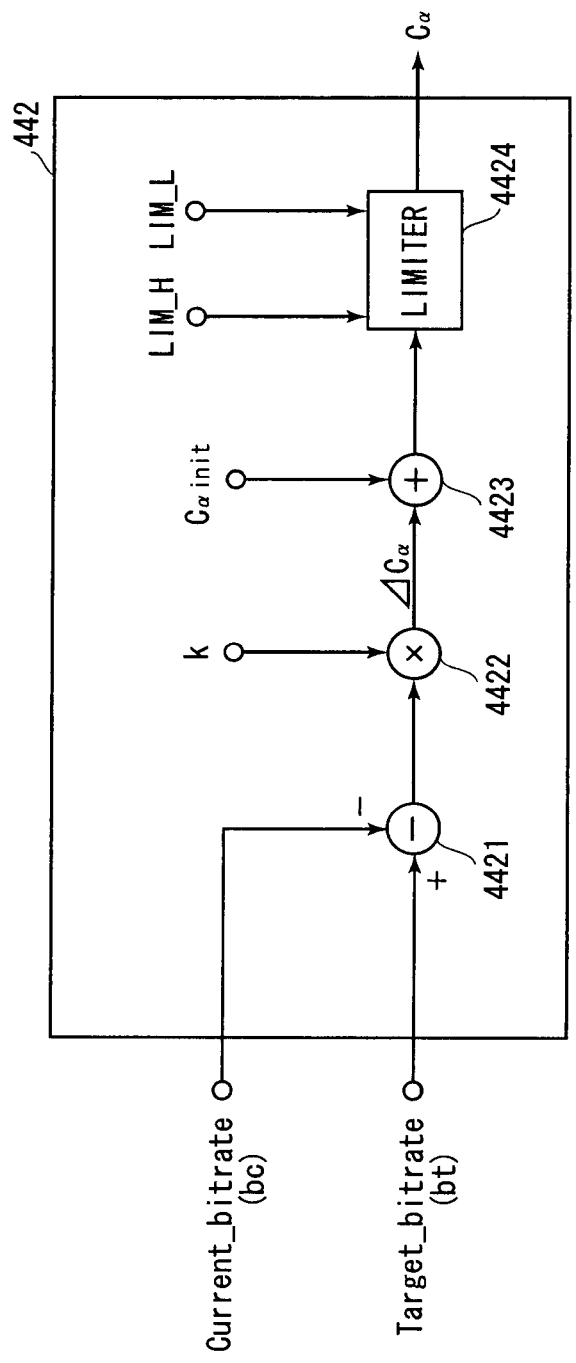
FIG. 13 is a block diagram showing a rate control factor calculation part.

FIG. 13 is a block diagram showing a rate control factor calculation part 442. The rate control factor calculation part 442 inputs the current bit rate (bc) and the target bit rate (bt) and outputs the rate control factor $C_\alpha$. The rate control factor calculation part 442 comprises a subtracter 4421, a multiplier 4422, an adder 4423 and a limiter 4424.

First, the subtracter 4421 subtracts the current bit rate (bc) from the target bit rate (bt). Next, the subtraction result (difference) is inputted to the multiplier 4422, to be multiplied by a factor k. Thus, a rate control displacement amount $\Delta C_\alpha$ is calculated. Subsequently, the rate control displacement amount $\Delta C_\alpha$ is inputted to the adder 4423, to be added to a rate control initial value $C_\alpha$init. As the rate control initial value $C_\alpha$init, usually, the value of 1.0 is used. Finally, the output value of the adder 4423 is inputted to the limiter 4424, to be limited. The limiter 4424 limits the output of the adder 4423 to a range from the lower limit value (LIM_L) to the upper limit value (LIM_H), which are set in advance, and outputs the rate control factor $C_\alpha$. Thus, the limiter 4424 clips the rate control factor $C_\alpha$, and this prevents the amount of generated codes from extremely oscillating. Eq. 6 expresses the calculation for obtaining the rate control factor $C_\alpha$. Eq. 6 does not include the function of the limiter 4424.

$$C_\alpha = k^*(bt-bc) + C_\alpha init \tag{Eq. 6}$$

Referring to FIG. 9 again, the rate control factor Cα outputted from the factor operation part 440 is inputted to a multiplier 407. Then, the adjustment quantization step value 74 outputted from the multiplier 406 is multiplied by the rate control factor $C_\alpha$, to calculate the quantization step value Qstep_AVC.

Thus, the rate control factor calculation part 442 calculates the rate control displacement amount $\Delta C_\alpha$ on the basis of the difference between the target bit rate (bt) and the current bit rate (bc) and adds the rate control displacement amount $\Delta C_\alpha$ to the rate control initial value $C_\alpha$init which is set in advance, to calculated the rate control factor $C_\alpha$. Since the adjustment quantization step value 74 is multiplied by the rate control factor $C_\alpha$, it is possible to adjust the calculated quantization step value Qstep_AVC to be approximate to the target bit rate (bt).

<The Eighth Preferred Embodiment>

Figure 14:
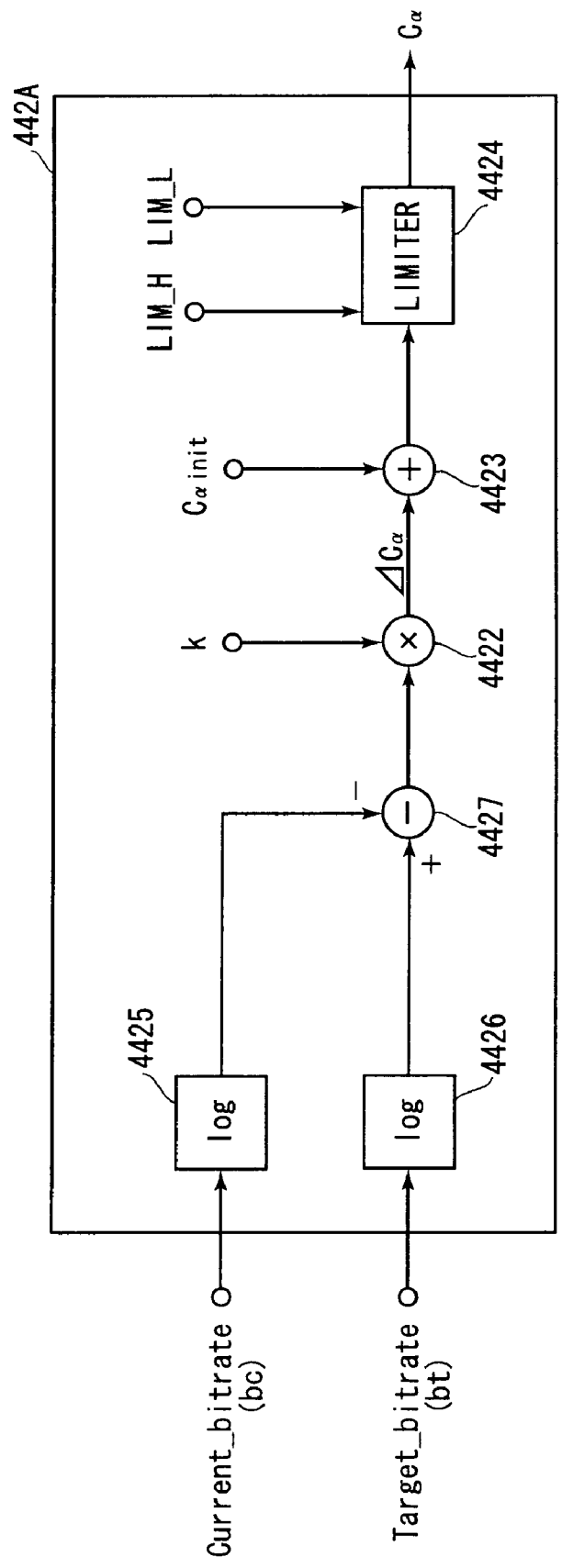
FIG. 14 is a block diagram showing a rate control factor calculation part in accordance with an eighth preferred embodiment.

A transcoder 1 of the eighth preferred embodiment is different from that of the seventh preferred embodiment only in the constitution of the rate control factor calculation part. FIG. 14 is a block diagram showing a rate control factor calculation part 442A in accordance with the eighth preferred embodiment.

First, the current bit rate (bc) is inputted to a logarithmic operation unit 4425 and the target bit rate (bt) is inputted to a logarithmic operation unit 4426. Then, after obtaining the respective logarithmic values, a subtracter 4427 obtains the difference between these logarithmic values. The following processing is the same as that of the rate control factor calculation part 442 shown in FIG. 13. Eq. 7 expresses the calculation for obtaining the rate control factor $C_\alpha$. Eq. 7 does not include the function of the limiter 4424.

$$C_\alpha = k^*(\log(bt) - \log(bc)) + C_\alpha init \tag{Eq. 7}$$

Also in the eighth preferred embodiment, the rate control can be performed on the basis of the difference between the target bit rate (bt) and the current bit rate (bc). In particular, since the logarithmic values of the target bit rate (bt) and the current bit rate (bc) are used, this can suppress too much rate control if the bit rate is high.

<The Ninth Preferred Embodiment>

Figure 15:
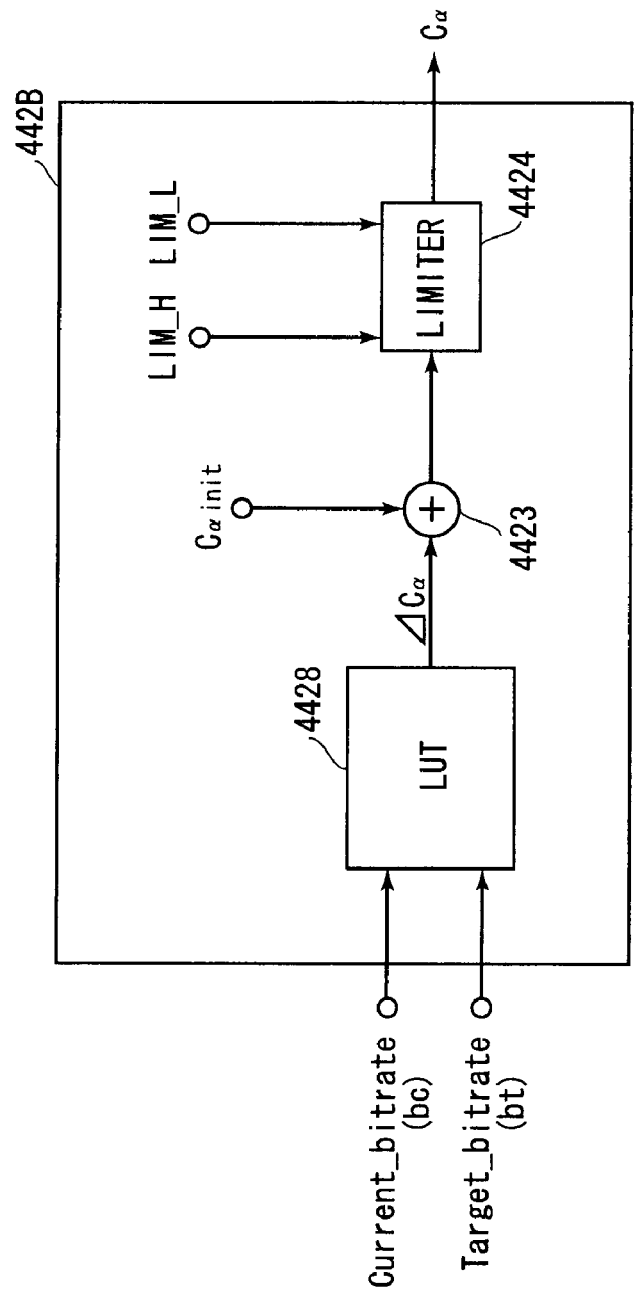
FIG. 15 is a block diagram showing a rate control factor calculation part in accordance with a ninth preferred embodiment.

A transcoder 1 of the ninth preferred embodiment is different from that of the seventh preferred embodiment only in the constitution of the rate control factor calculation part. FIG. 15 is a block diagram showing a rate control factor calculation part 442B in accordance with the ninth preferred embodiment.

First, the current bit rate (bc) and the target bit rate (bt) are inputted to a look-up table 4428. The look-up table 4428 is a table that brings the two input values (the current bit rate and the target bit rate) into correspondence with the rate control displacement amount $\Delta C_\alpha$ as an output value.

The following processing is the same as that of the rate control factor calculation part 442 shown in FIG. 13. Eq. 8 expresses the calculation for obtaining the rate control factor $C_\alpha$. Eq. 8 does not include the function of the limiter 4424.

$$C_\alpha = LUT(bc, bt) + C_\alpha init \tag{Eq. 8}$$

Also in the ninth preferred embodiment, the rate control can be performed on the basis of the difference between the target bit rate (bt) and the current bit rate (bc). In particular, since the look-up table 4428 is used, it is possible to determine the rate control factor $C_\alpha$ with more detailed characteristics, for the target bit rate (bt) and the current bit rate (bc).

<Variations>

In the seventh to ninth preferred embodiments, the step value adjustment factor α is calculated on the basis of the source bit rate (bs) and the target bit rate (bt). In this case, if neither the source bit rate (bs) nor the target bit rate (bt) changes during the processing, the step value adjustment factor α which is initially given may be continuously used.

On the other hand, there is a case where the source bit rate (bs) or the target bit rate (bt) changes. When the bit rate of the input source stream (MPEG2 stream) changes, for example, the source bit rate (bs) changes. There is another case where the transcoded H.264 data is stored in a storage medium such as a hard disk and the storage medium has a shortage of capacity. In such a case, the remaining amount (free space) of the hard disk is detected and the target bit rate (bt) is adaptively changed. When encoding is performed initially with 4 Mbps as the target bit rate (bt) and the hard disk has a shortage of capacity, for example, the target bit rate (bt) is reduced to 3 Mbps, 2 Mbps or the like.

Thus, when the source bit rate (bs) or the target bit rate (bt) is changed during the transcoding operation, the step value adjustment factor α is calculated again by using a new source bit rate (bs) or new target bit rate (bt), to obtain a more appropriate quantization step value Qstep_AVC.

Similarly, when the target bit rate (bt) is changed, the rate control factor C a may be calculated again in accordance with the change of the bit rate. This allows the quantization step value Qstep_AVC to adaptively change in accordance with the remaining amount of the hard disk.

Though the transcoders 1 in accordance with the preferred embodiments of the present invention have been discussed, all the processing means of the transcoder 1 in each of the preferred embodiments may be implemented by hardware or software. Implementation by software means that the processing parts include the hardware like a CPU and a RAM and a program executed by using the hardware resources. Alternatively, some of the processing means may be implemented by hardware and the other may be implemented by software.

In the seventh to ninth preferred embodiments shown in FIGS. 9 to 15, it is useful to implement the factor operation part 440 by software and constitute the other processing parts by using hardware resources. A function with the source bit rate (bs) and the target bit rate (bt) as inputs and the picture adjustment factors αI, αP and αB as outputs and a function with the current bit rate (bc) and the target bit rate (bt) as inputs and the rate control factor $C_\alpha$ as outputs are performed by software. In other words, the Qstep ratio determination part 441 and the rate control factor calculation part 442 are implemented by software. Alternatively, either one of the Qstep ratio determination part 441 and the rate control factor calculation part 442 may be implemented by software. This allows users (set makers) to rewrite coding characteristics for each product (each set, each lot) and it is thereby possible to achieve a more flexible system.

Though an exemplary case where a coded image of MPEG2 is transcoded to a coded image of H.264 has been discussed in the above preferred embodiments, the transcoder 1 of the present invention or the coding conversion method are applicable to other converting operations for various coded images. The transcoder and the method are applicable to transcoding from MPEG2 to MPEG2, transcoding from H.264 to H.264 or the like. The present invention can be applied to any type of coding systems only if an image is divided into images of frequency components and a coefficient to be assigned to the image of each frequency component is quantized or coded.

While the invention has been shown and described in detail, the foregoing description is in all aspects illustrative and not restrictive. It is therefore understood that numerous modifications and variations can be devised without departing from the scope of the invention.

What is claimed is:

1. A transcoder comprising:
   decoder means for decoding a first coded image;
   means for calculating a macroblock evaluation value indicating the degree of dispersion in pixel values inside a macroblock of an image obtained by decoding in said decoder means;
   means for obtaining an average macroblock evaluation value by averaging said macroblock evaluation values in a frame; and
   encoder means for encoding the image obtained by decoding in said decoder means to generate a second coded image,
   wherein said encoder means comprises
   means for acquiring an average quantization step value by averaging quantization step values in a frame of said first coded image;
   weighting value calculation means for calculating a weighting value for each macroblock on the basis of the difference between said macroblock evaluation value and said average macroblock evaluation value; and
   step value calculation means for calculating a converting quantization step value for each macroblock of said second coded image on the basis of a value obtained by adding said weighting value to said average quantization step value.

2. The transcoder according to claim 1, wherein said macroblock evaluation value is a differential absolute value sum of an average pixel value in a macroblock and each pixel value in the macroblock.

3. The transcoder according to claim 1, wherein said step value calculation means includes means for multiplying a value obtained by adding said weighting value to said average quantization step value by a step value adjustment factor which is larger than 1.

4. The transcoder according to claim 1, wherein said weighting value calculation means includes means for multiplying a difference between said macroblock evaluation value and said average macroblock evaluation value by a weighting value adjustment factor which is smaller than 1.

5. The transcoder according to claim 4, wherein said weighting value calculation means includes a limiter giving an upper limit to a value obtained by multiplication by said weighting value adjustment factor.

6. The transcoder according to claim 4, wherein said weighting value calculation means includes a limiter giving a lower limit to a value obtained by multiplication by said weighting value adjustment factor.

7. The transcoder according to claim 5, wherein said weighting value calculation means includes means for calculating an upper limit value of said limiter by multiplying said average quantization step value by a predetermined factor.

8. The transcoder according to claim 6, wherein said weighting value calculation means includes means for calculating a lower limit value of said limiter by multiplying said average quantization step value by a predetermined factor.

9. The transcoder according to claim 7, wherein said weighting value calculation means includes
   means for storing a fixed upper limit value to be set to said limiter; and
   means for selecting a smaller one out of the upper limit value obtained by multiplication by said predetermined factor and said fixed upper limit value, as an upper limit value of said limiter.

10. The transcoder according to claim 8, wherein said weighting value calculation means includes
    means for storing a fixed lower limit value to be set to said limiter; and
    means for selecting a larger one out of the lower limit value obtained by multiplication by said predetermined factor and said fixed lower limit value, as a lower limit value of said limiter.

11. The transcoder according to claim 3, wherein said step value calculation means includes
    means for storing a picture adjustment factor corresponding to a picture frame type; and means for selecting said picture adjustment factor corresponding to a picture frame type of an object macroblock and utilizing said selected picture adjustment factor as said step value adjustment factor.

12. The transcoder according to claim 1, further comprising
means for inputting a macroblock motion evaluation value indicating the degree of variation in a time direction, of a macroblock of an image obtained by decoding in said decoder means,
wherein said step value calculation means includes means for multiplying said average quantization step value by a motion adjustment value calculated on the basis of said macroblock motion evaluation value.

13. The transcoder according to claim 12, wherein
said macroblock motion evaluation value is an interframe differential absolute value sum between a macroblock and a reference image macroblock.

14. The transcoder according to claim 13, wherein
said macroblock motion evaluation value calculated in an immediately preceding P frame is substituted for said macroblock motion evaluation value of an I frame which can not be calculated.

15. The transcoder according to claim 13, wherein
said macroblock motion evaluation value calculated in an immediately preceding macroblock is substituted for said macroblock motion evaluation value of an intra macroblock, whether a P frame or a B frame, which can not be calculated.

16. The transcoder according to claim 13, wherein
said macroblock motion evaluation value calculated in a neighborhood macroblock is substituted for said macroblock motion evaluation value of an intra macroblock, whether a P frame or a B frame, which can not be calculated.

17. The transcoder according to claim 12, wherein
said step value calculation means includes means for calculating said motion adjustment value in accordance with the ratio between said macroblock motion evaluation value and said macroblock evaluation value.

18. The transcoder according to claim 3, wherein
said step value calculation means includes
means for calculating a picture adjustment factor corresponding to a picture frame type on the basis of a source bit rate of said first coded image and a target bit rate of said second coded image; and
means for selecting said picture adjustment factor corresponding to a picture frame type of an object macroblock and utilizing said selected picture adjustment factor as said step value adjustment factor.

19. The transcoder according to claim 18, wherein
said picture adjustment factor is recalculated when said source bit rate changes.

20. The transcoder according to claim 18, wherein
said target bit rate is changed in accordance with the capacity of a storage medium for storing said second coded image and said picture adjustment factor is recalculated in accordance with the change.

21. The transcoder according to claim 18, wherein
said target bit rate is changed in accordance with a free space of a storage medium for storing said second coded image and a rate control factor is recalculated in accordance with the change.

22. The transcoder according to claim 3, wherein
said step value calculation means includes
rate control factor calculation means for calculating a rate control factor on the basis of a target bit rate of said second coded image and a current bit rate of said second coded image; and
means for multiplying a value obtained by multiplication by said step value adjustment factor, by said rate control factor.

23. The transcoder according to claim 22, wherein
said rate control factor calculation means includes means for calculating said rate control factor on the basis of a differential value between said target bit rate and said current bit rate.

24. The transcoder according to claim 22, wherein
said rate control factor calculation means includes means for calculating said rate control factor on the basis of a differential value between a logarithmic value of said target bit rate and a logarithmic value of said current bit rate.

25. The transcoder according to claim 22, wherein
said rate control factor calculation means includes a look-up table for inputting said target bit rate and said current bit rate and outputting a rate control characteristic value, and
said rate control factor calculation means calculates said rate control factor on the basis of said rate control characteristic value.

26. The transcoder according to any one of claims 23 to 25, wherein
said rate control factor calculation means includes a limiter for giving an upper limit to said rate control factor.

27. The transcoder according to any one of claims 23 to 25, wherein
said rate control factor calculation means includes a limiter for giving a lower limit to said rate control factor.

28. The transcoder according to claim 22, wherein
said target bit rate is changed in accordance with the capacity of a storage medium for storing said second coded image and said rate control factor is recalculated in accordance with the change.

29. The transcoder according to claim 22, wherein
said target bit rate is changed in accordance with a free space of a storage medium for storing said second coded image and said rate control factor is recalculated in accordance with the change.

30. The transcoder according to claim 18, wherein
said means for calculating said picture adjustment factor is a software processing.

31. The transcoder according to claim 22, wherein
said rate control factor calculation means is a software processing.

32. A coded image conversion method comprising:
decoding, with a decoder of a transcoding apparatus, a first coded image;
calculating, with a processor of the transcoding apparatus, a macroblock evaluation value indicating the degree of dispersion in pixel values inside a macroblock of an image obtained by said decoding;
obtaining, with the processor of the transcoding apparatus, an average macroblock evaluation value by averaging said macroblock evaluation values in a frame; and
encoding, with an encoder of the transcoding apparatus, the image obtained by said decoding to generate a second coded image,
wherein said encoding includes,
acquiring an average quantization step value by averaging quantization step values in a frame of said first coded image, calculating a weighting value for each macroblock on the basis of the difference between said macroblock evaluation value and said average macroblock evaluation value, and calculating a converting quantization step value for each macroblock of said second coded image on the basis of a value obtained by adding said weighting value to said average quantization step value.

33. A non-transitory computer readable storage medium encoded with instructions, which when executed by a transcoding apparatus causes the transcoding apparatus to implement a method comprising:

decoding, with a decoder of a transcoding apparatus, a first coded image;

calculating, with a processor of the transcoding apparatus, a macroblock evaluation value indicating the degree of dispersion in pixel values inside a macroblock of an image obtained by said decoding;

obtaining, with the processor of the transcoding apparatus, an average macroblock evaluation value by averaging said macroblock evaluation values in a frame; and encoding, with an encoder of the transcoding apparatus, the image obtained by said decoding to generate a second coded image, wherein said encoding includes, acquiring an average quantization step value by averaging quantization step values in a frame of said first coded image, calculating a weighting value for each macroblock on the basis of the difference between said macroblock evaluation value and said average macroblock evaluation value, and calculating a converting quantization step value for each macroblock of said second coded image on the basis of a value obtained by adding said weighting value to said average quantization step value.

* * * * *